United States Patent

[11] 3,547,449

[72] Inventor James T. Dennis
812 American National Building,
Oklahoma City, Okla. 73102

[21] Appl. No. 705,794
[22] Filed Feb. 15, 1968
[45] Patented Dec. 15, 1970

[54] AUTOMATIC SPEED CHANGING MECHANISM FOR MULTI-SPEED PHONOGRAPH
10 Claims, 7 Drawing Figs.

[52] U.S. Cl. ........ 274/9, 274/39
[51] Int. Cl. ........ G11b 25/04
[50] Field of Search ........ 274/9.1, 39.1, 9, 39, 10S(Inquired)

[56] References Cited
UNITED STATES PATENTS
3,220,735 11/1965 Beugin ........ 274/9
3,162,447 12/1964 Hartman ........ 274/9
3,485,499 12/1969 Fukuda ........ 274/9

*Primary Examiner*—Samuel S. Matthews
*Assistant Examiner*—Steven L. Stephan
*Attorney*—Mason, Kolehmainen, Rathburn & Wyss

ABSTRACT: A lever, mounted upon and extending below the upper surface of a phonograph turntable, is arranged to move in a first horizontal plane when records having a first playing speed are played and is actuatable to move in a second horizontal plane, displaced vertically from said first plane, when records having a different playing speed are played. This lever, during the first turntable revolution following a change in its positioning, engages and shifts a phonograph speed control, thereby automatically adjusting turntable speed to match the speed requirements of the records being played.

INVENTOR
JAMES T. DENNIS
By Mason, Kolehmainen, Rathburn & Wyss.
Attorneys

INVENTOR
JAMES T. DENNIS
By Mason, Kolehmainen, Rathburn, & Wyss
Attorneys

AUTOMATIC SPEED CHANGING MECHANISM FOR MULTI-SPEED PHONOGRAPH

The present invention relates to phonographs, and, more particularly, to phonographs which are designed to play records having different playing speeds.

In the past, most phonographs have been equipped with a manually operable speed control arrangement having three or more positions required by the various types of records. While some arrangements have been proposed for automatically changing the turntable speed to conform with the record playing speed, these arrangements have either required special types of records, special record supporting arrangements, or have required the utilization of the record changing mechanism of a record changer to control the speed change.

During the past few years records having a playing speed of 78 r.p.m. have become practically obsolete and many record libraries include only 45 r.p.m. and 33⅓ r.p.m. records. Accordingly, it would be desirable to provide a simple speed-changing mechanism for a phonograph which is arranged to shift the turntable speed automatically in accordance with the playing speed of the record being played and independently of any record-changing mechanism. Such an arrangement would permit the manual play of either of the two popular types of records while eliminating the conventional manual speed control which is now required on most phonographs.

It is, therefore, an object of the present invention to provide a simple and economical speed-changing arrangement which permits the manual playing of either 33⅓ r.p.m. or 45 r.p.m. records without changing speeds manually.

It is another object of the present invention to provide a new and improved speed-changing mechanism for automatically shifting the turntable speed of a phonograph between two playing speeds which mechanism is operable independently of the conventional record-changing mechanism.

It is a further object of the present invention to provide a new and improved speed-changing arrangement for phonographs wherein movement of the turntable is employed directly to control a change in turntable speed.

A further object of the present invention resides in the provision of a new and improved phonograph speed-changing arrangement wherein the turntable speed is shifted during the first revolution of the turntable following the adaptation of the phonograph to a particular type of record.

Another object of the present invention is to provide a new and improved phonograph speed-changing arrangement which automatically adjusts the turntable to rotate at 45 r.p.m. when the phonograph is adapted to accept 45 r.p.m. records having a large centering aperture and automatically adjusts the turntable speed to 33⅓ r.p.m. when the phonograph is adapted to accept 33⅓ r.p.m. records having a small centering aperture.

Briefly, in accordance with the present invention the phonograph turntable carries a member that extends below the turntable surface. This member is changed in position when records having different playing speeds are played. The position of this member is thus indicative of the playing speed of the record being played. A two-position speed control lever is mounted below the turntable. This speed control lever is equipped with two horizontal flange portions positioned at different levels, one or the other of which is arranged to be struck by the member carried by the turntable as the turntable rotates, depending upon the position of this member corresponding to the playing speed of the record. When 45 r.p.m. records are played, the member carried by the turntable is in a first position and, as the turntable rotates, this member strikes one of the horizontal flanges of the speed control lever and shifts this lever to a 45 r.p.m. speed position. A toggle mechanism associated with the speed control lever holds the speed control lever in the 45 r.p.m. speed position and out of the path of the member carried by the turntable.

When 33⅓ r.p.m. records are played, the member carried by the turntable is in a second position and as the turntable rotates, this member strikes the other horizontal flange of the speed control lever and shifts this lever to the 33⅓ position. The toggle mechanism again functions to hold the speed control lever out of the path of the member carried by the turntable and also holds the speed control lever in the 33⅓ r.p.m. position.

The invention, both as to its organization and method of operation, together with further objects and advantages thereof, will best be understood by reference to the following specification taken in connection with the accompanying drawings, in which.

Figure 1:
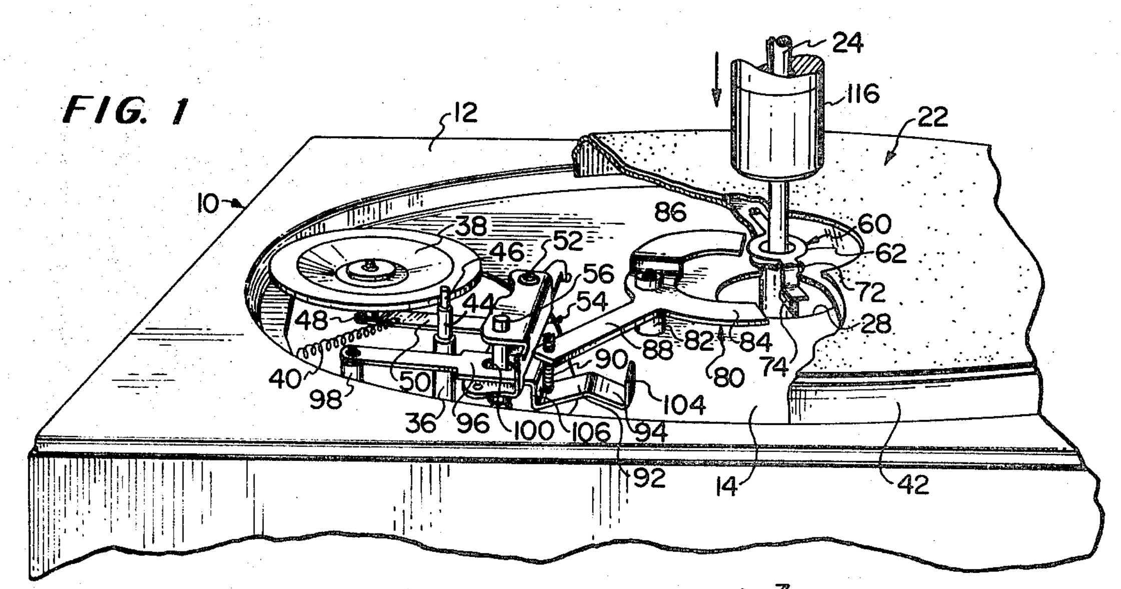
FIG. 1 is a perspective view, partly in section, of a phonograph incorporating the present invention.

Referring not to the drawings, the phonograph speed-changing mechanism of the present invention is therein indicated as comprising a phonograph, indicated generally at 10, which includes a base member having a depressed central portion 14, a turntable 22 and a small-hole record-centering spindle 24 positioned at the center of the turntable 22. The turntable 22 is rotatably mounted on a stationary sleeve-bearing member 26 which is mounted on a subassembly of the phonograph mechanism and extends upwardly through an opening 28 in the depressed central portion 14 of the base member 12. More particularly, the turntable 22 is provided with a central hub portion 30 which surrounds the bearing sleeve 26 and is secured to a top plate 32 of the turntable 22, a resilient record support mat 34 being positioned on the top plate 32 of the turntable 22.

In order to drive the turntable 22, a rotatable turret 36 is provided, which is arranged to be driven at constant speed by a suitable electric motor (not shown) and an idler wheel 38 is normally urged into engagement with one of the steps of the turret 36 by means of a coil spring 40, the spring 40 acting also to urge the idler wheel 38 into engagement with the inside surface of the rim 42 of the turntable 22 so that the turntable 22 may be driven at different speeds by engagement of the idler wheel 38 with different steps on the turret 36. Specifically, the turret 36 is provided with a 45 r.p.m. step 44 and a 33⅓ r.p.m. step 46.

The idler wheel 38 is rotatably mounted on a post 48 carried on the free end of one arm 50 of a bellcrank lever 51 which is pivotally mounted on a post 52 secured to the free end of a U-shaped support member 54. The other end of the support member 54 is pivotally mounted on a stationary post 56 and is also arranged to be slid vertically up and down the post 56 so that the idler wheel 38 may be positioned in alignment with either of the steps 44, 46 of the turret 36.

The other arm 58 of the bellcrank lever 51 is provided with a downturned flange portion which may be controlled by suitable linkage (not shown) so that the idler wheel 38 may be held out of engagement with the turret 36 and the turntable rim 42 during periods when the phonograph is not in use. In this connection it is noted that the turntable drive mechanism described thus far is similar to the arrangement disclosed in Dennis U.S. Pat. No. 3,321,205 which issued May 23, 1967 and reference may be had to this issued patent for a detailed description of the turntable drive mechanism. It is also pointed out that the speed-changing mechanism of the present invention may be incorporated in an automatic record changer of the type disclosed in my U.S. Pat. No. 3,321,205 and will function to adjust the speed of the turntable 22 automatically to either 33⅓ or 45 r.p.m. in the event that records having only these two playing speeds are to be played on such an automatic record changer. In addition, the speed-changing mechanism of the present invention permits the manual play of individual 33⅓ r.p.m. and 45 r.p.m. records on an automatic record changer of the type disclosed in my prior U.S.

Pat. No. 3,321,205, as will be more readily apparent from the following description.

Figure 3:
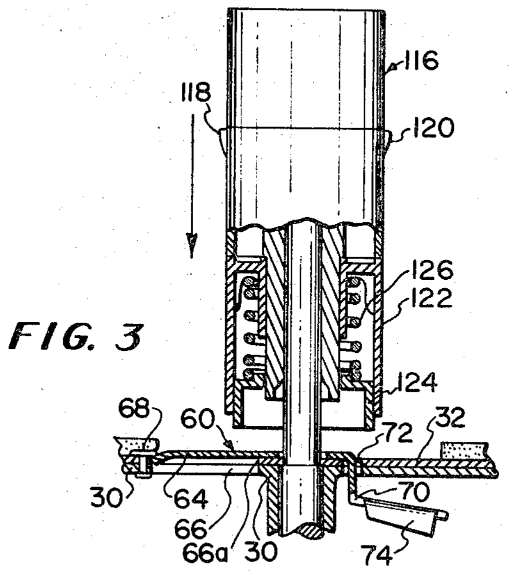
FIGS. 3 and 4 are views taken along the line 3—3 of FIG. 2 and showing the positioning of a 45 r.p.m. adapter on the phonograph.
Figure 4:
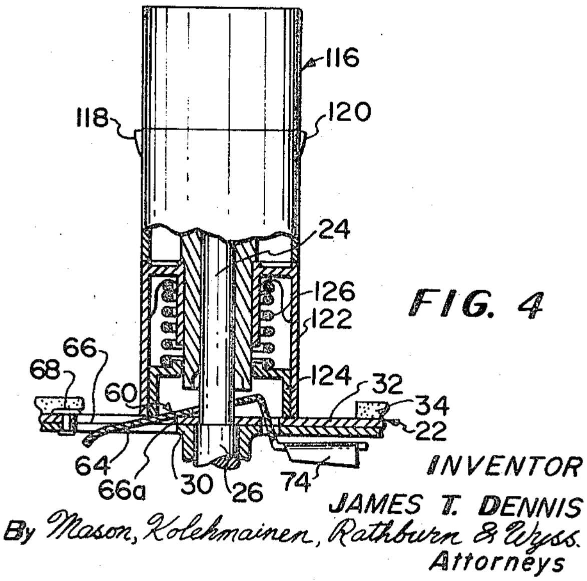

Considering now the speed-changing mechanism of the present invention, a control member indicated generally at 60 is loosely mounted on the turntable 22 in such manner that it may be tilted from the position shown in FIG. 3 to the position shown in FIG. 4, the control member 60 being also arranged to rotate with the turntable 22. More particularly, the control member 60 is provided with a central annular portion 62 which surrounds the spindle 24, and a first arm portion 64 which is positioned to move vertically within a slot 66 formed in the turntable hub 30 and turntable plate 32, the free end of the arm 64 being retained under the head of one of the rivets 68 which is employed to hold the hub 30 and plate 32 together. The control member 60 is also provided with an offset arm portion 70 which extends through an opening 72 in the members 30, 32 and is provided with a depending flange portion 74 on the end thereof which is positioned beneath the turntable hub 30. As most clearly illustrated in FIGS. 3 and 4, the positioning of the arm 64 within the slot 66 and the loose mounting of the control member 60 on the top plate 32 permits the member 60 to be shifted to either one of two positions by means to be described in more detail hereinafter, while the turntable 22 is rotating. As the turntable 22 rotates, the flange portion 74 of the lever 60 is thus arranged to move in a first relatively low annular path when the member 60 is in the position shown in FIG. 3, and is arranged to move in a different annular path above the first path when the member 60 is in the position shown in FIG. 4.

The flange portion 74 of the control member 60 is arranged to actuate a speed control lever indicated generally at 80, the lever 80 being mounted on the stud 82 which is secured to the central base portion 14, so that the lever 80 is arranged to be shifted horizontally to different speed control positions. The lever 80 includes a first horizontal flange portion 84 which is positioned to be engaged by the flange 74 of the control member 60 as the turntable 22 rotates, when the lever 60 is in the position shown in FIG. 3. The lever 80 is also provided with an offset horizontal flange portion 86 which is positioned to be engaged by the flange 74 of the lever 60 as the turntable 22 rotates, when the lever 60 occupies the position shown in FIG. 4. The lever 80 also includes an offset arm portion 88 which carries a vertically extending adjustment screw 90 on the free end thereof. The bottom end of the adjustment screw 90 rides on a pair of inclined surfaces 92 and 94 provided on an idler wheel positioning lever 96 the adjustment of which controls the vertical position of the support member 54 on the post 56 and hence the vertical position of the idler wheel 38 with respect to the turret steps 44, 46.

Figure 5:
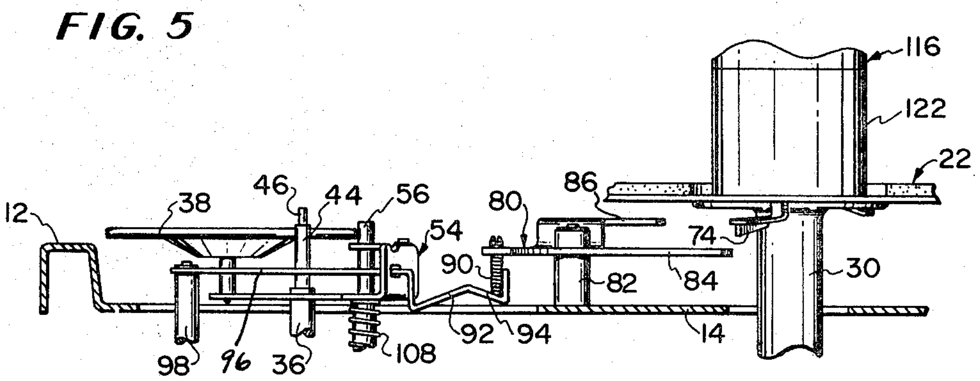
FIGS. 5, 6 and 7 are sectional views taken along the line 5-5 of FIG. 2 and showing different positions of the speed control mechanism of the present invention.
Figure 6:
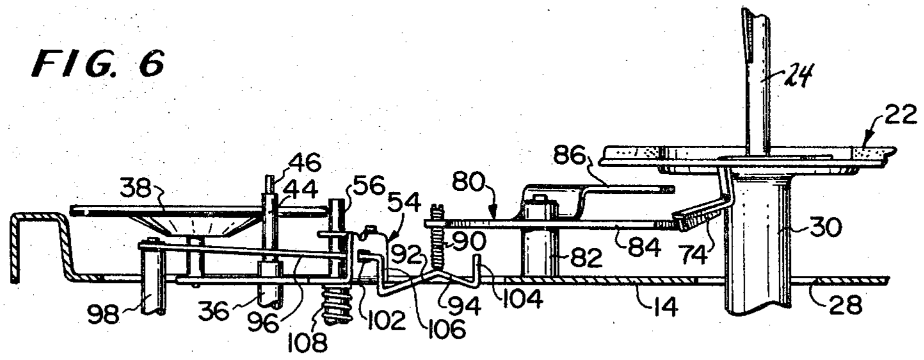
Figure 7:
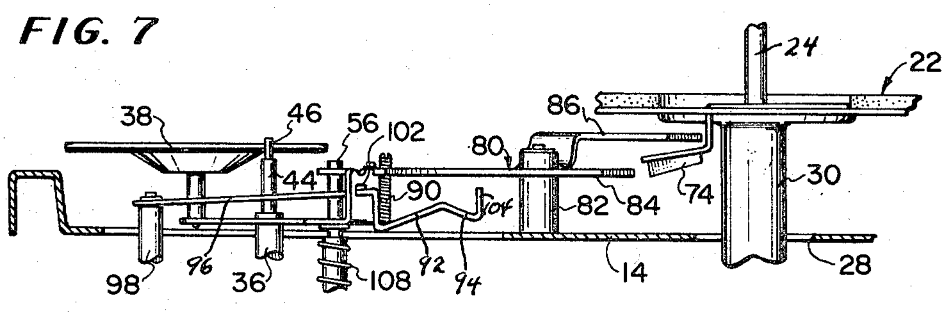

The idler wheel positioning lever 96 is pivotally mounted at one end of a post 98, is provided with a clearance slot 100 for the post 56, and extends through a horizontal slot 102 in the support 54, as is best illustrated in FIGS. 5, 6 and 7. The adjustment screw 90 rides on the inclined surfaces 92 and 94, which are formed in the other end of the lever 96, and extend between the end flange 104 and an intermediate right angle portion 106 thereof. A coil spring 108 is positioned about the post 56 and exerts an upward force on the support member 54 which force also urges the inclined surfaces 92, 94 into engagement with the end of the adjustment screw 90. Accordingly, due to the force of the spring 108, the adjustment screw will ride down one of the inclined surfaces 92 or 94 until it strikes one of the flanges 102 or 104, at which time the idler wheel 38 will be positioned to engage one of the steps 44, 46 of the turret 36. More specifically, if the adjustment screw 90 is positioned at an intermediate point on the inclined surface 92, the coil spring 108 will cause the screw 90 to ride down this inclined surface until the screw engages the flange 106 at which point the idler wheel 38 will be positioned correctly for engagement with the 33⅓ r.p.m. step 46 on the turret 36. On the other hand, if the screw 90 is positioned at an intermediate point along the surface 94, the spring 108 will function to move the screw down the surface 94 until it strikes the flange 104 at which point the support member 54, and hence the idler wheel 38, is positioned to engage the 45 r.p.m. step 44 of the turret 36, as shown in FIG. 5 of the drawings. The position of the flanges 104 and 106 along the inclined surfaces 92 and 94 thus determines two vertical positions of the idler wheel 38, since the speed control lever 80 can be shifted in a horizontal plane but cannot be moved vertically, and hence the screw 90 will set the position of the idler wheel 38 at two different levels depending upon the position to which the lever 80 is shifted.

The horizontal flange portions 84 and 86 of the speed control lever 80 are arranged so that when the flange portion 74 of the member 60 engages one or the other of these flanges, a camming action takes place which shifts the speed control lever 80 from one speed control position to the other. More specifically, assuming that the speed control lever 80 is in the 45 r.p.m. position shown in full lines in FIG. 2 and assuming further that the member 60 has just been shifted to the position shown in FIG. 3 in which the flange 74 moves in its lowest annular path, as the turntable rotates the flange 74 engages the inclined edge 110 of the horizontal flange portion 84 of the lever 80 and the camming action resulting from rotation of the turntable 22 operates to shift the lever 80 to a point at which the adjustment screw 90 has been moved up the inclined surface 94 and over onto the inclined surface 92. However, in accordance with an important feature of the invention the adjustment screw 90 is not moved completely down the surface 92 and into engagement with the flange 106 by the camming action of the flange 74. Instead, the camming action of the flange 74 ceases when it has moved past the corner 110*a* at which point the screw 90 is at an intermediate point along the incline 92. However, the coil spring 108 continues to exert an upward pressure on the adjustment screw 90 through the inclined surface 92 after the flange 74 has moved past the corner 110*a* of the flange portion 84. As a result, a togglelike action is produced so that the adjustment screw 90 is further shifted in the same direction and is moved to the position shown in dotted lines in FIG. 2. In this position, the corner 110*a* of the flange portion 84 is outside the path of the flange portion 74 so that there is no objectionable clicking noise during each revolution of the turntable 22, as would be produced if movement of the flange 74 were employed as the sole shifting force for the lever 80. It will be noted that the force producing this toggle action is produced by the combination of the spring 108 and the inclined surface 92, so that the spring 108 functions not only to provide and maintain the correct positioning of the idler wheel 38 but also produces the above described toggle action to move the lever 80 outside the path of the moving flange 74.

Figure 2:
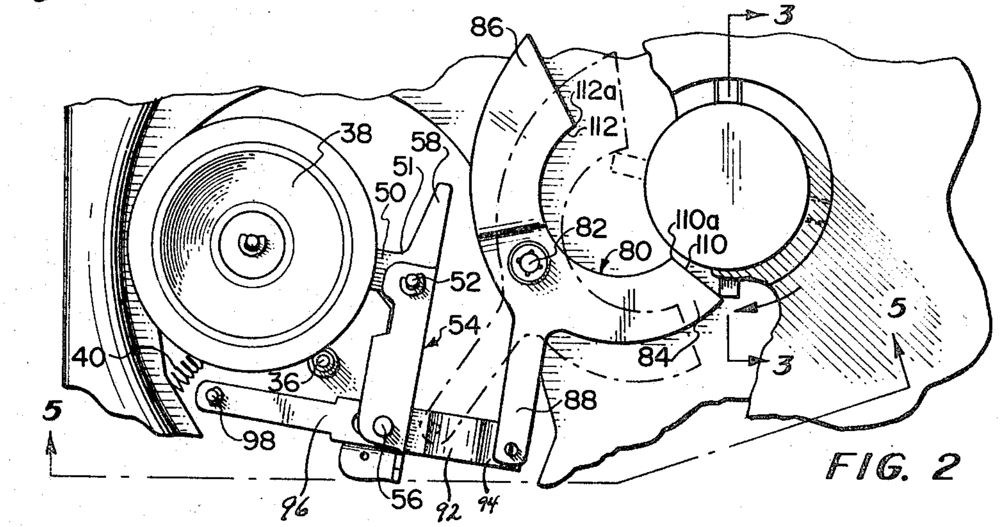
FIG. 2 is a fragmentary plan view, partly in section, of the phonograph shown in FIG. 1.

When the member 60 is shifted to the position shown in FIG. 4 the flange 74 moves in an elevated path and will strike the edge portion 112 of the horizontal flange portion 86 of the lever 80 and by camming action will shift the lever 80 in a counterclockwise direction about the post 82, as viewed in FIG. 2, so that the screw 90 is moved up the inclined surface 92 and over onto the surface 94. As the flange 74 leaves the corner 112*a* of the flange 86 a toggle action similar to that described above is produced by the action of the spring 108 which forces the screw 90 down the inclined surface 94 and into engagement with the flange 104. The idler wheel 38 is thus positioned in alignment with the 45 r.p.m. step 46 on the turret 36 while at the same time the corner 112*a* is removed from the path of the flange 74 so that no ticking noise is produced as the turntable 22 rotates at 45 r.p.m. When the member 60 is held in the position shown in FIG. 4, the flange 74 moves over the top of the horizontal flange portion 84 so that the turntable 22 continues to rotate at 45 r.p.m.

As the lever 80 is shifted to the 45 r.p.m. position shown in full lines in FIG. 2, by engagement of the flange 74 therewith, the screw 90 forces the positioning lever 96 downward as it rides over the inclined surface 92 so that a substantial downward force is exerted on the idler wheel 38 which is sufficient to force the idler wheel past the shoulder of the turret 36, between the steps 46 and 44 thereof, and onto the larger diameter step 44, even though the idler wheel 38 remains continuously in engagement with the turret 36. If this positive downward force were not exerted on the idler wheel 38, the bottom corner thereof would tend to hang up on the shoulder of the turret 36 and the idler wheel would continue to rotate at a speed corresponding to a turntable speed of 33⅓ r.p.m. Of course, the idler wheel 38 can be moved easily from the step 44 to the smaller step 46 as the lever 80 is shifted back to the 33⅓ r.p.m. position shown in FIG. 1.

Considering now the manner in which the member 60 is shifted to the position shown in FIGS. 3 and 4, in the illustrated embodiment such shifting action is produced by the placement of a 45 r.p.m. large-hole record adapter 116 onto the small-hole record-centering spindle 24 of the phonograph. During periods when the adapter 116 is not used, the member 60 occupies the position shown in FIG. 3. This is because the member 60 pivots about the end 66*a* (FIG. 3) of the slot 66 and the weight of the right-angle end portion 70 and flange 74 is sufficient to hold the end of the arm 64 up against the head of the rivet 68. Accordingly, when no large-hole record adapter is used, the flange 74 engages the flange portion 84 of the lever 80 and shifts the idler wheel 38 to the 33⅓ r.p.m. position shown in FIG. 7 during the first revolution of the turntable 22. The turntable thereafter rotates at 33⅓ r.p.m. and records may either be played manually be fitting them individually over the centering spindle 24 and onto the turntable 22, or may be played automatically by placing a stack of records on the centering spindle 24 and actuating the automatic record changing mechanism in a conventional manner and as described in detail in my prior U.S. Pat. No. 3,321,205.

When it is desired to play 45 r.p.m. large-hole records, the adapter 116 is fitted over the spindle 24 and is moved downwardly until it occupies the position shown in FIG. 4 The spindle 116 includes a pair of record-supporting shoulders 118 and 120 which are actuated by the record ejector member of the centering spindle 24 in a conventional manner. The bottom portion 122 of the adapter 116 is illustrated as being rotatably mounted with respect to the upper portion of the adapter and a spring-biased skirt portion 124 is recessed into the bottom portion 122 of the adapter, the skirt portion 124 being forced downwardly by means of a coil spring 126. When the adapter 116 is moved downwardly so that the bottom portion 122 is moved into engagement with the plate portion 32 of the turntable 22, the bottom edge of the adapter 116 forces the member 60 to pivot about the end 66*a* of the slot 66 so that the member 60 is tilted to the position shown in FIG. 4. Also, the skirt portion 124 of the adapter 116 is compressed into the portion 122 of the adapter 116 against the force of the spring 126 so that the skirt portion 124 exerts a downward force on the arm 64 which acts to hold the member 60 in its tilted position even though the portion 122 of the adapter is not moved downwardly by an amount sufficient to engage the plate 32 of the turntable 22. The spring-biased skirt 124 thus permits a rather wide tolerance in the vertical positioning of the adapter 116 on the spindle 24 while insuring that the member 60 will be tilted the required amount to accomplish the desired change in turntable speed. Thus the tilting movement of the member 60 will always be sufficient to move the flange 74 upwardly by an amount sufficient to cause it to engage the edge portion 112 of the lever 80. Accordingly, during the next revolution of the turntable 22, the lever 80 is shifted to the 45 r.p.m. position in the manner described in detail heretofore. Large-hole 45 r.p.m. records may now be played manually by fitting a record around the supporting shoulders 118, 120, or, in the alternative, a stack of 45 r.p.m. records may be placed on the shoulders 118, 120 and may be individually deposited onto the turntable 22 during successive record changing cycles of an automatic record-changing mechanism. In this connection, it is emphasized that the speed-changing mechanism of the present invention functions entirely independently of an automatic record-changing mechanism and hence permits the manual play of either 33⅓ r.p.m. records or 45 r.p.m. records while automatically accomplishing the above-described change in turntable speed to correspond to the desired playing speed of each type of record.

It is also pointed out that the adapter 116 need not be provided with the spring-biased skirt portion 124 if the bottom end of the adapter is arranged to exert the required force on the arm 64 so as to hold the member 60 in its tilted position. In the alternative, a 45 r.p.m. adapter for a single 45 r.p.m. record, such as the element 124, may be fitted over the spindle 24, in place of the entire adapter 116, and rest on the turntable plate 32, provided the adapter has sufficient weight to cause the lever 60 to move to its tilted position.

While there has been described what is at present considered to be the preferred embodiment of the invention, it will be understood that various changes and modifications thereof will occur to those skilled in the art.

I claim:

1. In a phonograph, the combination of a rotatable turntable, means for rotating said turntable, a first control element having first and second positions and which is movable to said first position in which said turntable is rotated at a first speed and to said second position in which said turntable is rotated at a second speed, a second control element rotatable in vertically displaced paths which are spaced from the center of said turntable, said second control element being mounted to move in a first horizontal plane when records having one of said first and second playing speeds are played and actuatable to move in a second horizontal plane displaced vertically from said first plane when records having a different playing speed are played, said first control element having a first portion engageable by said second control element when in said first plane for changing said first control element to one of said first and second positions in response to rotation of said turntable and having a second portion engageable by said second control element when in said second plane for changing said first control element to the other of said first and second positions in response to rotation of said turntable.

2. A phonograph according to claim 1 and including a spindle adapter positionable at the center of said turntable for records having a large center opening, said adapter being arranged to shift said second control element from one of said first and second planes to the other when placed upon said turntable.

3. A phonograph according to claim 2, in which said first control element includes upper and lower flange portions and said second control element is pivotally mounted on said turntable and includes a portion adapted to be depressed by said adapter when it is positioned on said turntable, thereby to pivot said second control element and cause engagement thereof with one of said flange portions as said turntable rotates.

4. A phonograph according to claim 1 and including toggle means connected to said first control element and operative to shift either of said first and second portions outside the path of said second control element following engagement thereof with said second control element.

5. In a phonograph, the combination of a horizontal rotatable turntable, drive means including an electric motor for rotating said turntable at two different speeds corresponding to the playing speed of two different types of records, a first control element rotatable with said turntable, said first control element being arranged to move in a first horizontal path when records having one playing speed are played and actuatable to move in a second horizontal path displaced vertically from said first path when records having a different playing speed are played, a second control element having a first flange portion engageable by said first control element when said first control element is moving in said first horizontal path so that said second control element is shifted to a first control position, said second control element having a second flange portion displaced vertically from said first flange portion and engageable by said first control element when said first element is moving in said second horizontal path so that said second control element is shifted to a second control position, and means for controlling said drive means in accordance with the movement of said second control element to said first and second control positions so that said turntable is rotated at the corresponding playing speed of the record being played.

6. A phonograph for playing first and second types of records at first and second playing speeds comprising a supporting base, a turntable rotatably mounted on said base and having a surface upon which records are positioned, said turntable being normally adapted to accept a first type of record, a first control member connected to said turntable so as to rotate with said turntable and having a lower portion that extends below the surface of said turntable, said lower portion being positionable in first and second positions and normally occupying said first position, conversion means for adapting said turntable to accept the second type of record and for shifting said lower portion of said first control member into said second position, variable speed turntable drive means attached to said base for rotating said turntable at the playing speeds of said two types of records, means for controlling the speed at which said drive means rotates said turntable and including a second control member which is movable to first and second control positions, said second control member including a first arm engageable by said lower portion when said lower portion is in said first position for shifting said second control member into said first control position in response to rotation of said turntable, and said second control member further including a second arm engageable by said lower portion when said lower portion is in said second position for shifting said second control member into said second control position in response to rotation of said turntable.

7. A phonograph according to claim 6 in which toggle means are provided for pulling said first and second arms of said second control member out of the path of said lower portion following an engagement between said lower portion and one of said arms.

8. A phonograph for playing first and second types of records having different playing speeds comprising, a rotatable turntable, a control member rotatable with said turntable and movable to different positions in which positions at least a portion of said control member moves in first or second annular paths which are vertically displaced from one another, variable speed drive means for said turntable and including a speed control element which is movable to a first position in which said turntable is rotated at the playing speed of one of said types of records and to a second position in which said turntable is rotated at the playing speed of the other of said types of records, said speed control element having a first portion engageable by said control member in response to movement of said control member in said first annular path for shifting said speed control element to one of said first and second positions and having a second portion engageable by said control member in response to movement of said control member in said second annular path for shifting said speed control element to the other of said first and second positions, and means movable into engagement with said control member and operative to move said control member so that said portion thereof is shifted from rotation in one of said annular paths to rotation in the other of said annular paths.

9. In a phonograph adapted for the manual playing of first and second types of records having different playing speeds, the combination of a rotatable turntable, a control member rotatable with said turntable, said control member being normally in a first position and being movable to a second position, variable speed drive means for said turntable and including a control element having two positions in one of which said turntable is rotated at the playing speed of one of said types of records and in the other of which said turntable is rotated at the playing speed of the other of said types of records, said control element being normally in said one position and being arranged to be moved to said other position by engagement of said control member therewith when said control member is in said second position and in response to rotation of said turntable, and adapting means arranged to be placed on said turntable to permit manual playing of one of said types of records and operative to move said control member to said second position.

10. In a phonograph adapted to play first and second types of records having different playing speeds, the combination of a rotatable turntable, variable speed drive means for said turntable and including a control element having first and second control positions in the first of which said turntable is rotated at the playing speed of said first type of record and in the second of which said turntable is rotated at the playing speed of said second type of records, control means rotatable with said turntable and movable to first and second positions, said control means being positioned in said first position when records having said first playing speed are played and being positioned in said second position when records having said second playing speed are played, said control means being operative when in said first position to move said control element to said first control position in response to rotation of said turntable and being operative when in said second position to move said control element to said second control position in response to rotation of said turntable.